United States Patent Office 3,475,460
Patented Oct. 28, 1969

3,475,460
4-(2-CARBOMETHOXY-2-PROPYL)PHTHALIC ANHYDRIDE
Jules L. Adelfang, Munster, Ind., assignor to Standard Oil Company, Chicago, Ill., a corporation of Indiana
No Drawing. Filed Nov. 22, 1963, Ser. No. 325,795
Int. Cl. C07d *69/76, 63/18;* C08g *17/00*
U.S. Cl. 260—346.3                                     1 Claim

ABSTRACT OF THE DISCLOSURE 2-carbomethoxy-2-propyl substituted aromatic carboxylic acids are prepared by the oxidation of 2-carbomethoxy-2-propyl substituted alkyl aromatic hydrocarbons. The oxidation is performed with molecular oxygen in the presence of bromine and a heavy metal catalyst and under liquid phase conditions. The compound 4-(2-carbomethoxy-2-propyl)phthalic anhydride is prepared by this method from methyl α-[4-(o-xylyl)]-isobutyrate.

---

This invention relates to a method of preparing (2-carbomethoxy-2-propyl) substituted aromatic mono- and di-carboxylic acids and more particularly pertains to a method of preparing said substituted aromatic mono- and di-carboxylic acids by a catalytic liquid phase oxidation employing molecular oxygen as the oxidant.

By basic permanganate oxidation of α (methylaryl) α, α-dimethyl acetic acids (α-methylarylisobutyric acids) there can be obtained α (mono- and di-carboxyaryl) isobutyric acids. These di- and tri-carboxylic acids are exceptionally useful in the preparation of high molecular weight polyesters, modified alkyds and polyamides as well as di- and tri-esters useful as plasticizers for vinyl chloride polymers because of the high temperature properties of the esters, especially their high boiling point. Esters of 4-(2-carboxy-2-propyl) benzoic acids such as the oxo-octyl, oxo-nonyl, etc. alcohol esters are interesting plasticizers for vinyl chloride polymers subjected to elevated temperature service. Polyesters from ethylene glycol and p-(2-carboxy-2-propyl) benzoic acid (α, α-dimethylhomoterephthalic acid), obtained by reacting either the acid or methyl 2-(p-carboxyphenyl) isobutyrate with ethylene glycol to obtain the bis-glycolate or bis (2-hydroxyethyl) esther and then subjecting the bisglycolate to polycondensation conditions to split out ethylene glycol, can be made which are linear high molecular weight polyesters and which have novel physical properties because of the aromatic carboxylic moiety and the aliphatic carboxylic acid moiety. These polyesters are somewhat of a compromise between polyesters derived from adipic acid and terephthalic acid. Likewise, the super polyamides derived from hexamethylene diamine and p-(2-carboxy-2-propyl) benzoic acid have physical properties between the super polyamides (nylon) from adipic acid and super polyamides from terephthalic acid.

The α-(methylaryl) isobutyric acids can be prepared by the alkylation of alkyl substituted aromatic hydrocarbons, for example toluene, xylenes, 1-methyl naphthalene, 4-methyl-biphenyl, cumene, cymene, ethylbenzene, ethyltoluenes, t-butyl toluenes, 2,6-di-methyl-naphthalene, 4,4'-dimethyl biphenyl and other alkyl substituted aromatic hydrocarbons with methacrylic acid or through the formation of the corresponding alkyl esters by the alkylation of the same aromatic hydrocarbons with an alkyl α-bromo- isobutyrate such as the methyl or ethyl ester or methacrylic acid in the presence of aluminum tribromide or aluminum trichloride, respectively, followed by hydrolysis. Alkyl α-(methylaryl) isbutyrates can be prepared from alkyl esters or methacrylic acid.

A new route to the α-(carboxyaryl) isobutyric acids has been discovered. This new route eliminates the contamination problems assocated with oxidations accomplished by basic permanganate oxidation and provides a more commercially feasible process route to these unique part aliphatic part aromatic acids. This new method comprises oxidizing methyl α-(mono- and di-alkylaryl) isobutyrates with molecular oxygen (commercial oxygen, air or mixtures thereof) in an oxidation zone at 50 to 350° C. under superatmospheric pressure to maintain a liquid phase in the oxidation zone and in the presence of a catalyst system provided by heavy metal oxidation catalyst and bromine. The oxidation produces methyl α-(mono- and di-carboxyaryl) isobutyrates which are readily hydrolzyed to α-(mono- and di-carboxyaryl) isobutyric acids.

It is advantageous to carry out the foregoing oxidation reaction in the presence of a reaction medium or solvent because the desired oxidation products are rather high boiling and heat of reaction cannot readily be removed or the desired oxidation product removed and recovered from the oxidation zone. However, the use of the reaction solvent or medium is not critical to the oxidation. Rather its use is advantageous for recovery and even purification of the desired oxidation products. Suitable reaction media or solvents are refractory materials liquid at oxidation conditions. Desirably, the reaction medium or solvent is chosen from monocarboxylic acids such as the saturated aliphatic acids, preferably lower ($C_2$ to $C_7$) aliphatic monocarboxylic acids of the acetic acid series and benzoic, cyclohexane carboxylic acid and the like. Acetic acid is the preferred aliphatic acid and benzoic acid is preferred for adiabatic operation techniques for utilizing the method of this invention. Ratios of 1 to 100 weight parts of reaction medium to compound to be oxidized are suitable. The amount of reaction medium used is not critical insofar as the oxidation reaction is concerned but is rather a matter of convenience.

Although the oxidation reaction involved in the method of this invention is the oxidation of alkyl substituents on aromatic rings to caboxylic group substituents on aromatic rings using the method and catalyst system first disclosed in U.S. Patent 2,833,816, that method and catalyst cannot be used to convert α-(mono- and di-alkyaryl) isobutyric acids to α-(mono- and di-carboxyaryl) isobutyric acids. For example, when α-tolyl isobutyric acids and α-xylyl isobutyric acids are subjected to the oxidation method of U.S. Patent 2,833,816 there are obtained phthalic acids and benzene tricarboxylic acids, respectively. Even though the starting acids contain in the isobutyric acid chain a tertiary carbon atom known to posses considerable resistance to oxidation and would, therefore, be strongly suggestive of resistance to the oxidation method of the foregoing patent, the isobutyric moiety chain is completely oxidized to carboxylic acid substituent on the aromatic ring perhaps through some free-radical attack on the phenylisobutyric acid structure involving the carboxyl hydrogen.

The materials to be oxidized by the method of this invention differ from those overly oxidized to aromatic polycarboxylic acids with all the carboxy group on the aromatic rings by the replacement of the hydrogen of isobutyric acid moiety with an alkyl hydrocarbon group. It might be assumed in view of the foregoing theory of attack of isobutyric acid carboxy hydrogen that the alkyl ester group merely blocks this vulnerable site. However, when the method of this invention is carried out using glacial acetic acid the alkyl ester group survives and preserves the isobutyrate moiety even thought the reaction medium itself or when ovidation by-product accumulates is rather strongly acidic. Thus the success of the method of this invention cannot be apparently forecast over the failure of oxidizing the substituted isobutyric acids to preserve the isobutyric acid moiety in the same oxidation system merely by theoretical consideration of ester group blocking of the vulnerable carboxy hydrogen site.

In the identification of the materials to be oxidized by the method of this invention, which materials have the formula

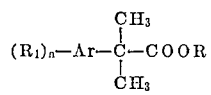

wherein $R_1$ is an alkyl group having 1 to 4 carbon atoms preferably methyl, $n$ is 1 or 2, Ar is di- or tri-substituted aromatic hydrocarbon suitably benzene, naphthalene or biphenyl and R is an alkyl hydrocarbon group; are named as di- and tri-substituted benzenes, naphthalenes and biphenyls for simplicity. Thus the isobutyrate moiety is named as a 2-carboalkoxy-2-propyl substituent. Since the alkyl ester group (R) will ultimately be removed in the utilization of the products of the method of this invention, it is preferred that R be methyl. For efficiency of compressor utilization in supplying molecular oxygen for the oxidation, it is preferred that $R_1$ also be methyl although when $R_1$ is ethyl, propyl, isopropyl, n-butyl, isobutyl, even t-butyl, t-amyl, decyl, dodecyl and higher carbon content alkyl, the oxidation method of this invention can be successfully used. Typical of the preferred methyl isobutyrate starting materials to be oxidized are 2-carbomethoxy-2-propyl, o-, m- and p-toluene, 2-carbomethoxy - 2-propyl xylenes including 1,2-dimethyl-4-(2-carbomethoxy-2-propyl) benzene and 1,3-dimethyl-4-(2-carbomethoxy - 2-propyl) benzene, 2-carbomethoxy-2-propyl o-, m- and p - ethylbenzene, 2 - carbomethoxy-2-propyl o, m and p-cumene, 2-carbomethoxy-2-propyl substituted cymenes, 2-carbomethoxy-2-propyl substituted di-isopropylbenzenes, 2-carbomethoxy-2-propyl o-, m- and p-(t-amyl) benzenes, 2 - carbomethoxy-2-propyl mono-methylnaphthalenes, 2-carbomethoxy-2-propyl dimethyl-naphthalenes, p - (2-carbomethoxy-2-propyl substituted) p'-methylbiphenyl, 2-carbomethoxy-2-propyl dimethylbi-phenyls and the like.

The catalyst system for the process of this invention comprises a combination of bromine and a heavy metal oxidation catalyst. The heavy metal component of the catalyst system can comprise one or more of the metallic elements selected from those having an atomic weight of from about 50 to about 200. Of these, the metals having an atomic number of from 23 to 28 are the desirable metal components of the catalyst system. Particularly excellent results are obtained with a metal or a combination of metals of the group consisting of manganese, cobalt, nickel, chromium, vanadium, molybdenum, tungsten, tin and cerium. The metals may be added as the metals per se or in a combined or ionic form. The bromine portion of the catalyst system may be supplied by elemental bromine or bromine in the combined or ionic form. Suitable sources of bromine are ammonium bromide, tetra-bromoethane, potassium bromate, benzyl bromide, among others which will honor the reaction conditions, liberate bromine generally in the ionic form. The metals may be supplied as their carboxylate salts or salts of inorganic acids or in the form of an organic complex such as the acetyl acetonates or the 8-hydroxy-quinolates or complexes with ethylene diamine tetraacetate. It is readily apparent that it would be advantageous to employ the bromine and the metal components of the catalyst system in forms soluble in benzoic acid and/or the polyalkyl benzene. However, water soluble forms of the bromine and/or metal component of the catalyst system can be also employed since their aqueous solutions can be dissolved in the benzoic acid and the water added thereby will be vented from the oxidation reactor during the oxidation process. The preferred range of catalyst components is in the range of 0.1 to 1.0% total metals and 0.1 to 1.0% bromine both by weight based on the aromatic hydrocarbon.

The method of this invention can be further understood from the following illustrative examples.

Example 1.—Preparation of methyl α-(carboxyaryl)-isobutyrate

A solution prepared by dissolving 20 g. (0.104 mole) of methyl α-tolyisobutyrate and 0.5 g. of tetrabromoethane in 200 ml. of glacial acetic acid and adding 0.5 g. of cobaltous acetate tetrahydrate and 1.0 g. of manganous acetate tetrahydrate in 5 ml. of water was heated to 390–400° F. and 300 p.s.i.g. of nitrogen. Air was added and after 30 minutes, when the absorption of oxygen was 0.25 mole, the reaction was terminated and the solvent was removed. Distillation of the residue yielded 11.7 g. (51%) of methyl α-(carboxyphenyl)-isobutyrate, B.P. (0.5 mm.) 135–140°, as a yellow oil that slowly solidified. A sample of the mixture of isomeric half esters was purified by crystallization from pentane, M.P. 65–95–, neut. eq.: calc. 222; found 220. The nuclear magnetic resonance spectrum of this material is consistent with the structure proposed and hydrolysis of a sample by heating with concentrated hydrochloric acid for 5 hours produced a mixture of α, α-dimethylhomophthalic acids. Fractionation using ethyl acetate yielded a sample of α, α-dimethylhomoterephthalic acid, M.P. 226–230°, that did not give a melting point depression upon admixture with an authentic sample.

Example 2.—Preparation of 4-(2-carbomethoxy-2-propyl)-phthalic anhydride

As described in Example 1, the oxidation of 50 g. (0.242 mole) of methyl α-[4-(o-xylyl)]isobutyrate was carried out in 250 ml. of acetic acid containing 0.5 g. of tetrabromoethane, 0.5 g. of cobaltous acetate tetrahydrate, 1.0 g. of manganous acetate tetrahydrate and 5 ml. of water. The oxygen absorption was 0.86 mole in 40 minutes. Removal of the solvent and distillation of the residue yielded 41 g. (67%) of 4-(2-carbomethoxy-2-propyl)-phthalic anhydride, B.P. (0.1 mm.) 158–160°. An analytical sample, M.P. 78–79°, was prepared by crystallization from benzene-pentane and sublimation under reduced pressure.

Analysis.—Calcd. for $C_{13}H_{12}O_5$: C, 62.91, H, 4.87, neut. eq., 124. Found: C, 62.49, H, 4.42, neut. eq. 125.

By the process of Example 1 substituting methyl α-ethylphenyl isobutyrates for methyl α-tolyl butyrates a mixture of isomeric methyl α-(carboxyphenyl) isobutyrates can also be prepared from which, when hydrolyzed and the hydrolyzate fractionated, α, α-dimethylhomoterephthalic acid (p-carboxyphenylisobutyric acid) can be recovered. Other 2-carbomethoxy-2-propyl substituted monoalkyl benzenes can be likewise oxidized to α, α-dimethylhomophthalic acids. Also other 2-carbomethoxy-2-propyl substituted xylenes and substituted dialkylbenzenes can be oxidized to 22-carbomethoxy-2-propyl benzene dicarboxylic acid for example (2-carbomethoxy-2-propyl)-3,5-dimethylbenzene can be oxidized to 2-carbomethoxy-2-propyl isophthalic acid, 2-carbomethoxy-2-propyl 3,4-diethylbenzene can be oxidized and dehydrated to 4 - (2 - carbomethoxy - 2 - propyl) phthalic anhydride as can 2-carbomethoxy-2-propyl (3-ethyl-4-ethylyl) benzene. To prepare 4-carboxy 4'-(2-carbomethoxy-2-propyl) biphenyl there is oxidized in the process of this invention 4-methyl 4-(2-carbomethoxy-2-propyl) biphenyl. By the oxidation of a mixture of 1-methyl-2-(2-carbomethoxy-2-propyl) and 1-methyl-4-(2-carbomethoxy-2-propyl)-naphthalenes by the process of this invention there can be obtained a mixture of 2-(2-carbomethoxy-2-propyl) naphthoic acid and 4-(2-carbomethoxy-2-propyl) naphthoic acid. As hereinbefore mentioned, 2-carboxy-6-(2-carbomethoxy-2-propyl) naphthalene results from the oxidation of 2-methyl-6-(2-carbomethoxy-2-propyl) naphthalene by the process of this invention.

In either of Examples 1 or 2 a mixture of cobalt and manganese bromides can be substituted for cobalt and manganese acetates with tetrabromoethane and substantially the same results achieved. Also in Examples 1 and 2 ammonium bromide and/or sodium bromide in amounts providing equivalent amounts of bromine can be substituted for tetrabromoethane to achieve substantially the same results.

What is claimed is:
1. The compound 4 - (2 - carbomethoxy - 2 - propyl) phthalic anhydride having the formula

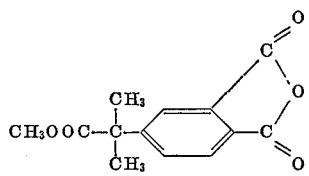

having a boiling point (0.1 mm. Hg.) of 158–160° C. and melting at 78–79° C.

References Cited

UNITED STATES PATENTS 2,833,816    5/1958    Saffer et al. _____ 260—475
2,880,237    3/1959    Knoblock _____ 260—475

NICHOLAS S. RIZZO, Primary Examiner

B. I. DENTZ, Assistant Examiner

U.S. Cl. X.R.
260—076, 078